March 18, 1958     A. BAUM     2,827,082
CARTON LOADER
Filed Oct. 29, 1956

INVENTOR.
ALVAN BAUM
BY
ATTORNEYS

United States Patent Office 2,827,082
Patented Mar. 18, 1958

2,827,082

CARTON LOADER

Alvan Baum, Yakima, Wash., assignor to Fruit Industries Research Foundation, Yakima, Wash., a corporation of Washington Application October 29, 1956, Serial No. 618,915

5 Claims. (Cl. 141—154)

This invention relates to machines for loading cartons with loose articles such as apples.

A main object of the present invention is to provide a carton loader which is capable of more accurately loading cartons with loose articles than prior machines, and which accomplishes this without bruising or damaging the articles.

The machine of the present invention has a chute for loading articles into a carton on a carton holder. The chute projects into the carton to keep from bruising or otherwise damaging the articles being packed and is provided with a gate at the delivery end thereof which is operated at the end of a loading cycle to retain articles in the chute from passing into the carton and overloading the carton. The gate and chute are so connected that at the time the gate is operated, the chute is raised to a position to allow an empty carton to be placed in the holder.

Various other objects of the present invention will be apparent from the following description taken in connection with the accompanying drawings, wherein.

Figure 1:
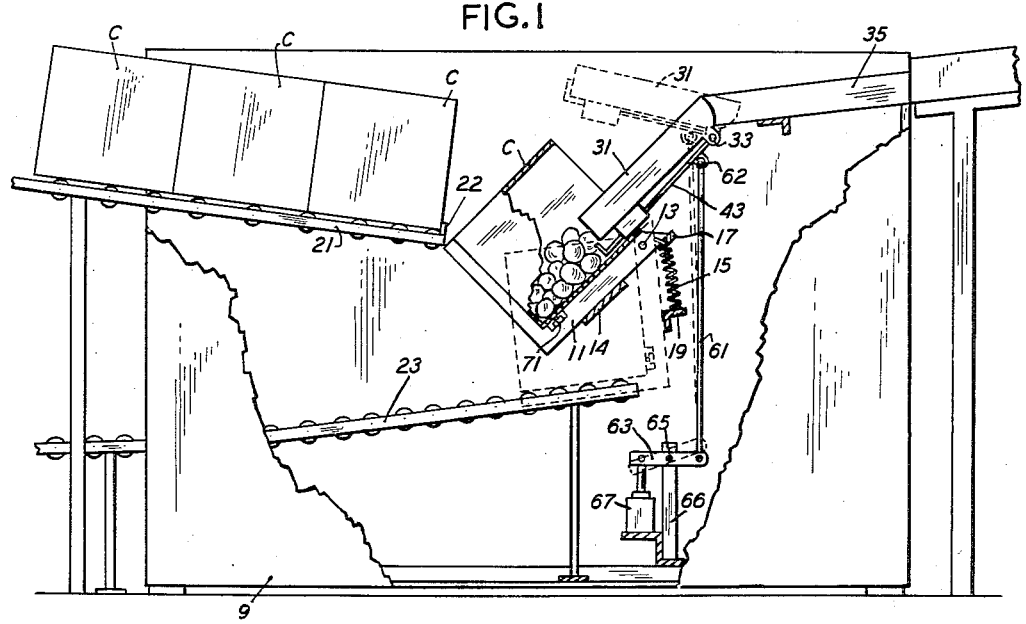
Fig. 1 is a side view of a carton loader embodying the concepts of the present invention, parts being broken away for convenience in illustration.

Referring to the accompanying drawings, the machine includes a frame 9 having a carton holder in the form of a cradle 11 swingably mounted thereon about a pivot 13. The cradle comprises a pair of spaced fork arms joined by a cross strip 14. A set of springs 15 urge the cradle to an upward position against stops 17 and the cradle may move downwardly against the resistance of the springs 15 to a lower position against stop 19. In its upper position, the holder is supplied with an empty carton C by a roller conveyor 21, a suitable mechanism 22 of common construction being provided for supplying an empty carton to the holder at the proper time. Since such mechanism is of no importance to the present invention it has not been disclosed. It may, for instance, comprise a solenoid operated finger.

In the lower position of the cradle, the fork arms of the cradle straddle a roller conveyor 23 to deposit a loaded carton C thereon. Because of the inclination of the conveyor 23, the carton is conveyed off to the left, as the parts are shown in Fig. 1.

Projecting into the carton C is a chute 31 which is pivoted by a shaft 33 on the frame 9 for movement from the lower full line position to the upper dotted line position shown in Fig. 1. The chute is open at both ends and at its upper end is adapted to be supplied with loose articles such as apples from a suitable chute conveyor 35, or other suitable supply means.

Figure 2:
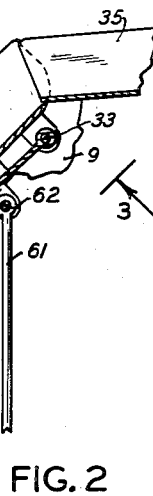
Fig. 2 is an enlarged longitudinal vertical section through the chute showing details of construction.
Figure 3:
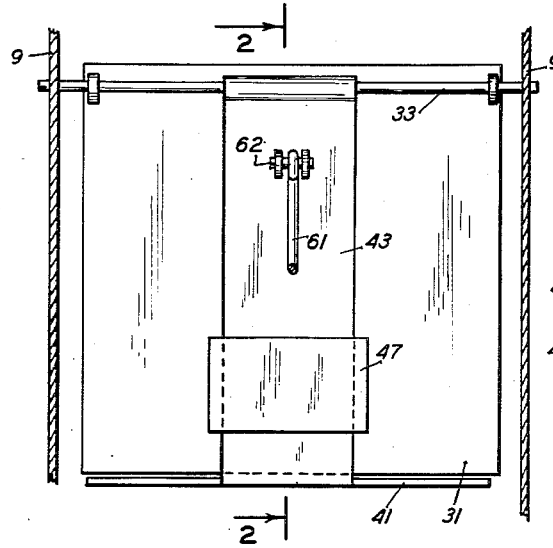
Fig. 3 is a sectional view taken along line 3—3 of Fig. 2, showing the underside of the chute.

At the lower or delivery end of the chute, the chute is provided with a gate 41, Fig. 2, which is fixedly mounted on the lower end of an arm 43, the arm being pivotally mounted on the shaft 33 on the frame 9 of the machine. The arm loosely extends through a U-shaped guide 47 secured to the underside of the chute 31. The gate 41, under the influence of gravity, tends to assume a position with the arm resting on the lower portion of the guide 47, the guide being proportioned so that the upper edge of the gate will be disposed flush with or slightly below the floor of the chute 31, when the arm assumes such position. However, when the arm 43 is swung upwardly toward the chute 31, the gate 41 is projected upwardly to a blocking position with regard to the delivery end of the chute.

A suitable linkage is provided for moving the gate to its blocking position and for returning the chute 31 to its upper initial position. The linkage includes a vertical link 61 pivotally connected at 62 its upper end to the arm 43 at a place intermediate the gate and the shaft 33, and is pivotally connected at its lower end to a horizontal link 63, Fig. 1, which is pivoted intermediate its ends at 65 on a standard 66 on the frame of the machine. A solenoid 67 is mounted on the standard 66 and is connected to the other end of the horizontal link 63 and is adapted when energized to move the link upwardly and cause the gate to move to its closed position and then cause the chute to be swung upwardly to a non-delivery position. The operation of the solenoid is controlled by a normally closed switch 71 mounted on the cradle 11 in a position to be engaged by a carton in the cradle. The arm 43 may be considered as a lost-motion connection between the link 61 and the chute 31.

The operation of the machine is as follows. Assuming that the cradle 11 is empty, the springs 15 will cause it to assume the upper full line position in Fig. 1 against stops 17. Switch 71 will be closed so that the solenoid will be energized and the chute will be in its upward dotted line position, clear of the path along which a carton will travel in its movement from conveyor 21 to cradle 11. The mechanism 22 is now operated, or automatically operates, depending on its construction, to release a carton C for movement onto the cradle. Switch 71 is opened by the carton, de-energizing solenoid 67, allowing chute 31 to drop down into the mouth of the carton, with the guide 47 resting against the inner wall of the carton. Gate 41 simultaneously drops downwardly so that articles in the chute, which were blocked by the gate, can move under the influence of gravity into the carton. As the carton is progressively filled, it descends until when full it engages the conveyor 23 and begins to move along the conveyor and off of the cradle. Switch 71 is allowed to close as soon as the carton commences such movement to energize the solenoid 67 which operates to first move the gate 41 to a blocking position to retain articles in the chute against movement into the filled carton, and then elevates the chute 31 to the dotted line position shown. Because of the gate, the carton may be accurately filled. Also, the gate prevents articles in the chute from being thrown out the end of the chute and around the packing room during upward movement of the chute.

Having described the invention in what is considered to be the preferred embodiment thereof, it is desired that it be understood that the invention is not to be limited other than by the provisions of the following claims.

I claim:

1. A carton loader comprising a frame, a carton holder mounted on the frame for movement from an upper empty position to a lower filled position, means for supplying an empty carton to said holder when said holder is at its upper position, means for conducting a loaded carton away from said holder when said holder is in its lower position, article supply means, a chute for conducting articles from said article supply means into a carton on said holder, means mounting said chute for movement from an upper inoperative position clear of the path along which a carton travels during its movement from the carton supply means to said holder to a lower operative position projecting into a carton on said holder, a gate at the delivery end of said chute, means mounting said gate for movement from a position blocking the passage of articles from said chute to a nonblocking position, said gate being disposed in said nonblocking position in the operative position of said chute, means operable when actuated for moving said gate to its blocking position and for elevating said chute, and means for actuating the last-mentioned means.

2. A carton loader comprising a frame, a carton holder mounted on the frame for movement from an upper empty position to a lower filled position, means for supplying an empty carton to said holder when said holder is at its upper position, means for conducting a loaded carton away from said holder when said holder is in its lower position, article supply means, a chute for conducting articles from said supply article means into a carton on said holder, means mounting said chute for movement from an upper inoperative position clear of the path along which a carton travels during its movement from the carton supply means to said holder to a lower operative position projecting into a carton on said holder, a gate at the delivery end of said chute, means mounting said gate for movement from a position blocking passage of articles from said chute to a nonblocking position, said gate being disposed in said nonblocking position in the operative position of said chute, means operable when actuated for first moving said gate to its blocking position and for then elevating said chute, and means associated with said carton holder and operable when said holder reaches its lower position for actuating the last-mentioned means.

3. A carton loader comprising a frame, a carton holder mounted on the frame for movement from an upper empty position to a lower filled position, means for supplying an empty carton to said holder when said holder is at its upper position, means for conducting a loaded carton away from said holder when said holder is in its lower position, article supply means, a chute for conducting articles from said article supply means into a carton on said holder, means mounting said chute for swinging movement about an axis spaced from its delivery end from an upper position clear of the path along which a carton travels during its movement from the carton supply means to said holder to a lower position projecting into a carton on said holder, a gate at the delivery end of said chute, an arm beneath said chute mounting said gate for swinging movement about an axis spaced from the delivery end of said chute from a position blocking passage of articles from said chute to a nonblocking position, a mechanism connected to said arm and operable when actuated for moving said arm against said chute to raise said gate to its blocking position and then to elevate said chute, and means associated with said carton holder and operable when said holder reaches its lower position for actuating said mechanism.

4. A carton loader comprising a frame, a carton holder mounted on the frame for movement from an upper empty position to a lower filled position, means for supplying an empty carton to said holder when said holder is at its upper position, means for conducting a loaded carton away from said holder when said holder is in its lower position, article supply means, a chute for conducting articles from said article supply means into a carton on said holder, means mounting said chute for swinging movement about an axis spaced from its delivery end from an upper position clear of the path along which a carton travels during its movement from the carton supply means to said holder to a lower position projecting into a carton on said holder, a gate at the delivery end of said chute, an arm beneath said chute mounting said gate for swinging movement about an axis spaced from the delivery end of said chute from a position blocking passage of articles from said chute to a nonblocking position, a mechanism connected to said arm and operable when actuated for moving said arm against said chute to raise said gate to its blocking position and then to elevate said chute, and means associated with said carton holder and operable when said holder reaches its lower position for actuating said mechanism, the last-named means including a solenoid connected to said mechanism and switch means connected to said solenoid.

5. A carton loader comprising a frame, a carton holder swingably mounted on the frame for movement from an upper empty position to a lower filled position, means for supplying an empty carton to said holder when said holder is at its upper position, means for conducting a loaded carton away from said holder when said holder is in its lower position, article supply means, a chute for conducting articles from said article supply means into a carton on said holder, means mounting said chute for swinging movement from an upper inoperative position clear of the path along which a carton travels during its movement from the carton supply means to said holder to a lower operative position projecting into a carton on said holder, a gate at the delivery end of said chute, means mounting said gate for movement from a position blocking passage of articles from said chute to a nonblocking position, said gate being disposed in said nonblocking position in the operative position of said chute, means operable when actuated for moving said gate to its blocking position and then for elevating said chute, the just-mentioned means having a lost-motion connection with said chute and a direct connection with said gate, and means associated with said carton holder and operable when said holder reaches its lower position for causing operation of said just-mentioned means.

No references cited.